May 1, 1962     A. M. ZALKIND     3,031,794
NOVELTY FLY SWATTER FOR AMUSEMENT PURPOSES
Filed April 6, 1960
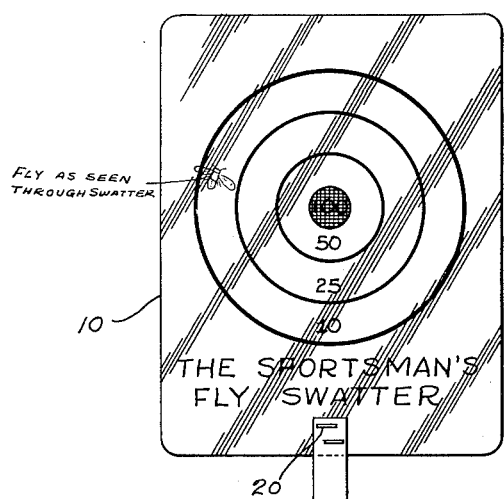
FIG. 1.
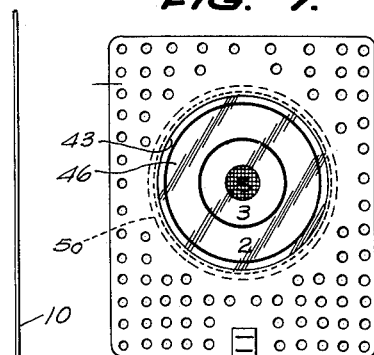
FIG. 2.    FIG. 7.
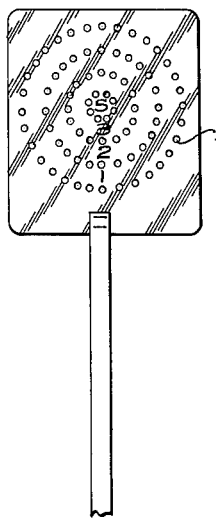
FIG. 5.
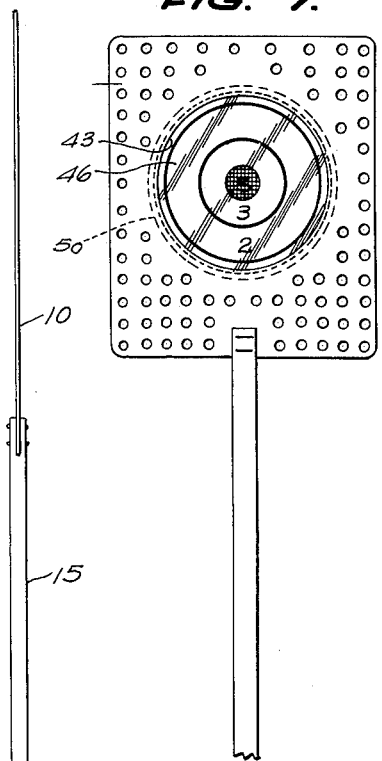
FIG. 3.
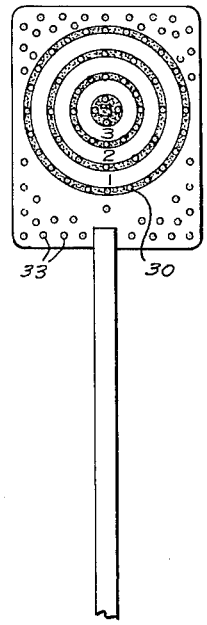
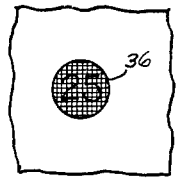
FIG. 4.
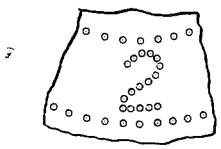
FIG. 6.
INVENTOR.
Albert M Zalkind

United States Patent Office 3,031,794
Patented May 1, 1962

3,031,794
NOVELTY FLY SWATTER FOR AMUSEMENT PURPOSES
Albert M. Zalkind, Arlington, Va.
(1026 Warner Bldg., Washington, D.C.)
Filed Apr. 6, 1960, Ser. No. 20,436
6 Claims. (Cl. 43—137)

This invention relates to amusement devices and more particularly to devices requiring a degree of skill in use.

It is an object of the invention to provide a fly swatter usable for swatting flies but provided with means for affording amusement in such activity. It is another object of the invention to provide a novelty fly swatter wherein a person wielding same may test his skill, reaction time, and general dexterity.

It is an additional object of the invention to provide a novelty fly swatter which may be very cheaply mass produced and which requires no components other than a swatting element attached to a handle.

Briefly, the fly swatter of this invention comprises a swatting element 10 made of flexible transparent plastic having a scoring target imprinted thereon. A person using the fly swatter tries to hit a fly as close to the bull's-eye as possible in order to achieve a high score. A detailed description of the invention will now be given in conjunction with the appended drawing, in which:

FIG. 1 shows a plan view of the invention.
FIG. 2 illustrates a side view.
FIGS. 3, 4, 5, 6 and 7 show modified forms of the invention, in full or in fragmentary form.

Referring now to FIGS. 1 and 2, the novelty fly swatter comprises a swatting element 10 of generally conventional fly swatting size, for example, 4" by 6" or the like, which element 10 is made of a suitably flexible plastic sheet material which is transparent. Such materials are quite common, for example, cellulose acetate, vinyl, polystyrene, etc. Printed on one face of the swatting element 10 is a target, as shown, having the usual bull's-eye and scoring rings concentric therewith. A suitable stick or handle 15 is stapled at 20 to the lower edge of the swatting element 10 in any conventional manner. Thus, the end of handle 15 may be slotted to take a position at the edge of the staples through the laminated assembly.

As shown in FIG. 1, it is possible to see through the element 10 in order to watch a fly (as shown in phantom lines) approaching a landing surface and in order to center the target as accurately as possible over the resting fly in order to swat the fly with as high a score as possible. When the blow has been dealt with sufficient force, it is obvious that the fly will leave clear evidence thereof on the under side or working surface of the swatting element 10, as flies usually do when hit hard. For that matter, the entire body of the fly frequently adheres to the swatter. Accordingly, a suitable tool 25 which may be die-cut from sheet plastic is carried as by a rubber band 27 by handle 15. The tool, which is designated as a "Remains Remover," is primarily present to be seen for amusement, although, of course, it could function for its apparent purpose.

It is appreciated that many people who enjoy a joke item of this kind would not actually use the swatter for its apparent purpose although, of course, it could be used. For such people, the swatter is primarily for the purpose of providing amusement merely by its appearance and apparent function. Such appearance and apparent function are sufficient to provoke laughter and, indeed, the item has been found quite successful in that regard without resorting to actual use. Thus, the utility of the invention from the standpoint of an important purpose, namely, to effect merriment, has been amply demonstrated by actual models. However, there are persons who are of a literal turn of mind and who would insist on using the swatter for its apparent purpose. For these people, an aerodynamically modified swatter as shown in FIG. 3 would probably be preferable, as described below.

In accordance with operational theory relating to fly swatters, a completely solid swatter element that is, one of non-perforate form, is more difficult to use because the imperforate area compresses air thereinbelow as it approaches the surface on which a fly may be resting. Such sudden compression of air as effected by the high velocity of movement of the swatting element effects a gust of air outwardly of the confines of the swatting element, which gust aids the fly in escaping should he be minded to do so. Accordingly, the imperforate form of the invention, for example as shown in FIG. 1, may require more skill, speed and target centering accuracy than would be required in the use of a perforate swatting element as shown in FIG. 3. Thus, in FIG. 3 the printed rings are shown as having spaced perforations 30 therethrough, and additional perforations 33 may be provided around the border. Such perforations should be very small, of course, possibly no more than a sixteenth to a thirty-second of an inch in diameter. Preferably the thickness of the printed lines of the target should be slightly in excess of the perforations therethrough so as to conceal the perforations as much as possible. Thus, a fly swatter as illustrated in FIG. 3 would theoretically be easier to use, requiring a lesser degree of skill than the fly swatter shown in FIG. 1.

In any event, the novel construction of the swatter element plus target thereon which enables a "sportsman" to take aim before "firing" serves the amusement aspect of the device. In addition, the transparency permits scoring without turning the fly swatter over to look at the working surface, since the result of a swat will be very evident by looking through the front surface of the swatting element, if, in fact, the swatter is actually put to use.

While I provide the scoring numerals in the top surface of the swatting element, it is obvious that they could be provided on both surfaces. For example, as shown in FIG. 4, a fragment of transparent material is shown having an opaque disk 36 printed thereon and it will be understood that such a disk can be printed in register on both sides of the material. Thereafter, a numeral in a contrasting color, such as the numeral 25 as shown in FIG. 4, may be printed on each opaque disk. In fact, the opaque disk may be applied only to one surface of the swatting material; a numeral printed on the reverse surface will be clearly and directly readable against the background provided by the opaque disk.

FIG. 5 shows a version wherein the scoring rings and bull's-eye are delineated merely by small perforations 40, the numerals being printed. However, it will be apparent that the numerals could also be delineated by perforations as shown in FIG. 6.

FIG. 7 shows a composite swatter element 41 comprising flexible rubber or plastic opaque sheet material, or injection molded flexible plastic material or rubber, such as is well known and conventional in household flyswatters. However, a large center area 43 has been removed, either by die cutting a finished unit or by molding the element with a central aperture. The aperture is closed by a disk 46 of flexible plastic transparent sheet, on which a target is printed, in a manner quite similar to the swatter element 10 of FIG. 1. The disk 46 is cemented at its margin 50 to the surrounding margin of the swatter element 41, or it may be plastic welded depending on the nature of the materials used. For bonafide practical use, the form of the invention of FIG. 7 may be preferable because of the inherent and long wearing properties of the opaque material of element 41 as commonly known and used in flyswatters. Also, the disk 46 could be fastened by stitching, marginally, instead of cementing or welding. The transparent disk would be reinforced and cushioned by the tougher surrounding material.

Of course, it is not actually necessary to strike a fly so hard as to mash it in order to kill it. However, scoring, even with a light blow such as will leave no mark or smear, may readily be accomplished by merely maintaining the swatter stationary at the end of the stroke and looking through it. The dead fly will be pinned between the surface on which it last rested and the swatter, so that a score may be noted. In any event, scoring is noted by simply looking through the front side of the swatter, it not being necessary to turn the swatter over to see at what point on the surface the fly was struck.

Having thus described my invention, I am aware that various changes may be made without departing from the spirit thereof, and, accordingly, I do not seek to be limited to the precise illustrations herein given except as set forth in the following claims.

I claim:

1. A novelty fly swatter for amusement purposes comprising a swatter element comprised of transparent material having designated areas indicated thereon by printed scoring zones for indicating swatting accuracy, and a handle secured to said swatting element.

2. A fly swatter for amusement purposes having a swatting element of transparent flexible material, a target comprising a bull's-eye substantially at the center of the area of said swatting element and surrounded by concentric scoring rings, including handle means secured to said swatting element.

3. A novelty fly swatter as set forth in claim 2, including perforations through said swatting element, said perforations being disposed spaceably through said scoring rings.

4. A novelty fly swatter for amusement purposes having a swatting element comprised of a transparent flexible material at the central area thereof, said transparent material having a visible target represented thereon, said target representation being through said central area.

5. A novelty fly swatter for amusement purposes as set forth in claim 4, wherein said swatter element comprises a frame of relatively opaque material.

6. A novelty fly swatter for amusement purposes comprising a swatter element of flexible transparent material having a target represented thereon comprising a bull's-eye area surrounded by concentric scoring rings designated as to scoring value, said bull's-eye area and said concentric scoring rings being delineated by perforations.

References Cited in the file of this patent

UNITED STATES PATENTS

| | | |
|---|---|---|
| 975,570 | Porter | Nov. 15, 1910 |
| 1,277,216 | Hutton | Aug. 27, 1918 |
| 1,348,423 | Hyman | Aug. 3, 1920 |
| 1,370,496 | Ratcliff | Mar. 1, 1921 |